United States Patent
Cooper et al.

(10) Patent No.: US 9,935,724 B1
(45) Date of Patent: Apr. 3, 2018

(54) PRODUCT DISTRIBUTION MODELING SYSTEM AND ASSOCIATED METHODS

(71) Applicant: The United States of America, as represented by the Secretary of the Air Force, Washington, DC (US)

(72) Inventors: Reginald L. Cooper, London, OH (US); Leonard E. Lightfoot, Miamisburg, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 15/602,595

(22) Filed: May 23, 2017

(51) Int. Cl.
*H04B 17/00* (2015.01)
*H04B 17/391* (2015.01)
*H04W 24/06* (2009.01)

(52) U.S. Cl.
CPC ..... *H04B 17/3912* (2015.01); *H04B 17/3911* (2015.01); *H04W 24/06* (2013.01)

(58) Field of Classification Search
USPC ...................................... 455/67.16, 450–455
See application file for complete search history.

(56) References Cited

U.S. PATENT DOCUMENTS

| | | |
|---|---|---|
| 4,105,958 A | 8/1978 | Pierce et al. |
| 4,464,791 A | 8/1984 | Eness |
| 4,679,248 A | 7/1987 | McKeown |
| 4,737,928 A | 4/1988 | Parl et al. |
| 4,977,607 A | 12/1990 | Maucksch et al. |
| 5,062,148 A | 10/1991 | Edwards |
| 5,191,594 A | 3/1993 | Argo et al. |
| 5,233,628 A | 8/1993 | Rappaport et al. |
| 5,355,519 A | 10/1994 | Hasegawa |
| 5,465,393 A | 11/1995 | Frostrom et al. |
| 5,794,128 A | 8/1998 | Brockel et al. |

(Continued)

OTHER PUBLICATIONS

Kheirallah et al., "M-Profile Ray Tracing Technique for Multipath Propagation", Jan. 1987, Electronics Letters, vol. 23, No. 2. (pp. 82-83).

(Continued)

*Primary Examiner* — Fayyaz Alam
(74) *Attorney, Agent, or Firm* — AFMCLO/JAZ

(57) ABSTRACT

An emulator for modeling a network of K transmitters, L receivers, and M multipath components using a product distribution modeling system. The emulator determines for each of MLK paths defined between the transmitters and receivers respective delay, loss, and fading components. The fading component (e.g., attenuation-based, multipath, or both) is determined by calculating a weight value of a time-varying random variable type for each input impulse associated with the K transmitters and for each output impulse associated with the L receivers (including multipath). The modeling subsystem determines a signal propagation value for a modeled communication channel among the MLK paths by combining the delay component, the loss component, and the respective weight values of the input and output impulses associated with the modeled communication channel. The testing subsystem uses the signal propagation value to emulate the modeled communication channel using one or more computer processors.

20 Claims, 13 Drawing Sheets

(56) References Cited

U.S. PATENT DOCUMENTS

| | | | |
|---|---|---|---|
| 5,862,455 A | 1/1999 | Martin et al. | |
| 5,973,638 A | 10/1999 | Robbins et al. | |
| 6,058,261 A | 5/2000 | Rapeli | |
| 6,061,394 A | 5/2000 | Itahara | |
| 6,134,514 A | 10/2000 | Liu et al. | |
| 6,236,363 B1 | 5/2001 | Robbins et al. | |
| 6,571,082 B1 | 5/2003 | Rahman et al. | |
| 6,600,926 B1 | 7/2003 | Widell et al. | |
| 6,618,696 B1 | 9/2003 | Dean et al. | |
| 6,724,730 B1 | 4/2004 | Mlinarsky et al. | |
| 6,922,395 B1 | 7/2005 | Elliott et al. | |
| 7,184,720 B2 | 2/2007 | Poutanen et al. | |
| 7,203,223 B2 | 4/2007 | Meinilä et al. | |
| 7,286,802 B2 | 10/2007 | Beyme et al. | |
| 7,394,880 B2 | 7/2008 | Kemppainen et al. | |
| 7,508,868 B2 * | 3/2009 | Chang | H04B 17/0087 375/224 |
| 7,620,368 B2 | 11/2009 | Wang et al. | |
| 7,698,121 B2 | 4/2010 | Steenkiste et al. | |
| 8,442,538 B2 * | 5/2013 | Segall | H04W 4/02 370/332 |
| 9,357,409 B2 * | 5/2016 | Das | H04W 24/06 |
| 2003/0088390 A1 | 5/2003 | Jamsa et al. | |
| 2003/0236089 A1 * | 12/2003 | Beyme | H04B 17/0087 455/423 |
| 2005/0053008 A1 | 3/2005 | Griesing et al. | |

OTHER PUBLICATIONS

Noble et al., "Trace-Based Mobile Network Emulation", Sep. 1997, Proc. of ACM SIGCOMM 1997. (11 Pages).
Kevin Fall, "Network Emulation in the Vint/NS Simulator", Jul. 1999, Proc. of the Fourth IEEE Symposium on Computers and Communications. (7 Pages).
Punnoose et al., "Optimizing Wireless Network Protocols Using Real-Time Predictive Propagation Modeling", Aug. 1999, Proc. of the Radio and Wireless Conference (RAWCON) (3 Pages).
Papenfuss et al., "A TMS320C6701/FPGA Based Frequency Selective RF Channel Simulator Using IF Sampling", Aug. 2000, Texas Instruments DSPS Fest, (pp. 1-6).
White et al., "Lowering the Barrier to Wireless and Mobile Experimentation", Oct. 2002, Proc. of Hotnets-I. (6 Pages).
Mahadevan et al., "MobiCom Poster: Emulating Large-Scale Wireless Networks using ModelNet", Mobile Computing and Communications Review, vol. 7, No. 1. Sep. 2002 (3 Pages).
Mahadevan et al., "Emulating Large-Scale Wireless Networks using ModelNet", Sep. 2002, MOBICOM'02. (pp. 1-2).
Hernandez et al., "RAMON: Rapid-Mobility Network Emulator", Nov. 2002, Proc. 0f 27th IEEE Conference on Local Computer Networks (LCN'02). (9 Pages).
Lin et al., "A Dynamic Topology Switch for the Emulation of Wireless Mobile Ad Hoc Networks", Nov. 2002, Proc. of the 27th Annual IEEE Conference on Local Computing Networks (LCN'02) (3 Pages).
Judd et al., "Repeatable and Realistic Wireless Experimentation through Physical Emulation", 2004, ACM SIGCOMM Computer Communications Review. (pp. 63-68).
Kuusilinna et al., "Describing MIMO Designs for Rapid Prototyping in the Bee Environment", Sep. 2004, European Signal Processing Conference. (pp. 693-696).
Takai et al., "Scalable Testbed for Next-Generation Wireless Networking Technologies", 2005, Proc. First Int'l Conf. of TRIDENT. (3 Pages).
Raychaudhuri et al., "Overview of the ORBIT Radio Grid Testbed for Evaluation of Next-Generation Wireless Network Protocols", Mar. 2005, Proc. of WCNC 2005, New Orleans, LA. (6 Pages).
De et al., "MiNT: A Miniaturized Network Testbed for Mobile Wireless Research", Mar. 2005, Proc. of Infocom 2005, Miami, FL. (12 Pages).
Zhou et al. "WHYNET: A Hybrid Testbed for large-Scale, Heterogeneous and Adaptive Wireless Networks", Sep. 2006, WiNTECH. (14 Pages).
Varshney et al., "WHYNET: A Framework for the In-Situ Evaluation of Heterogeneous Mobile Wireless Systems", Sep. 2007, WiNTECH. (__ Pages).
Spirent Communications, "SR5500 Wireless Channel Emulator", Dec. 2007. (8 Pages).
Spirent Communications, "TAS4500 FLEX5 RF Channel Emulator", 2008, <http://www.spirent-communications.com/> (8 Pages).
Propsim, "PROPSim C8 Wideband Multichannel Simulator", 2008, <http://www.propsim.net/> (1 Page).
Kevin Borries et al., "FPGA-Based Channel Simulator for a Wireless Network Emulator", 2009, Carnegie Mellon University, IEEE 978-1-4244-2517-4. (5 Pages).
Kevin Borries, "Hybrid Scalable Real-Time Channel Simulation for Wireless Network Emulation", Spring 2011, Carnegie Mellon University, ECE PhD Thesis. (24 Pages).
Kennedy et al., "Performance Evaluation of Spectrum Sharing Technologies", 2014, IEEE SSPARC Workshop. (3 Pages).

* cited by examiner

| CASES | NUMBER OF 404 (SET OF) | | | NUMBER OF 402 (SET OF) 800 | | | |
|---|---|---|---|---|---|---|---|
| | TRANSMITTERS | RECEIVERS | TAPS | ADDS | DELAYS | MULTIPLIERS | ADMs |
| 1 | 2 | 2 | 4 | 12 | 12 | 16 | 40 |
| 2 | 4 | 4 | 4 | 48 | 48 | 64 | 160 |
| 3 | 2 | 2 | 16 | 60 | 60 | 64 | 184 |
| 4 | 8 | 8 | 4 | 192 | 192 | 256 | 640 |
| 5 | 4 | 4 | 16 | 240 | 240 | 256 | 736 |
| 6 | 2 | 2 | 64 | 252 | 252 | 256 | 760 |
| 7 | 16 | 16 | 4 | 768 | 768 | 1024 | 2560 |
| 8 | 8 | 8 | 16 | 960 | 960 | 1024 | 2944 |
| 9 | 4 | 4 | 64 | 1008 | 1008 | 1024 | 3040 |
| 10 | 16 | 16 | 16 | 3840 | 3840 | 4096 | 11776 |
| 11 | 8 | 8 | 64 | 4032 | 4032 | 4096 | 12160 |
| 12 | 16 | 16 | 64 | 16128 | 16128 | 16384 | 48640 |

PRIOR ART

FIG. 3C

|  | NUMBER OF 804 (SET OF) | | | NUMBER OF 802 (SET OF) | | | | 
|---|---|---|---|---|---|---|---|
| CASES | TRANSMITTERS | RECEIVERS | TAPS | ADDS | DELAYS | MULTIPLIERS | ADMs |
| 1 | 2 | 2 | 4 | 66.67% | 66.67% | 50.00% | 60.00% |
| 2 | 4 | 4 | 4 | 83.33% | 83.33% | 75.00% | 80.00% |
| 3 | 2 | 2 | 16 | 80.00% | 80.00% | 75.00% | 78.26% |
| 4 | 8 | 8 | 4 | 91.67% | 91.67% | 87.50% | 90.00% |
| 5 | 4 | 4 | 16 | 90.00% | 90.00% | 87.50% | 89.13% |
| 6 | 2 | 2 | 64 | 88.89% | 88.89% | 87.50% | 88.42% |
| 7 | 16 | 16 | 4 | 95.83% | 95.83% | 93.75% | 95.00% |
| 8 | 8 | 8 | 16 | 95.00% | 95.00% | 93.75% | 94.57% |
| 9 | 4 | 4 | 64 | 94.44% | 94.44% | 93.75% | 94.21% |
| 10 | 16 | 16 | 16 | 97.50% | 97.50% | 96.88% | 97.28% |
| 11 | 8 | 8 | 64 | 97.22% | 97.22% | 96.88% | 97.11% |
| 12 | 16 | 16 | 64 | 98.61% | 98.61% | 98.44% | 98.55% |

FIG. 8

PRODUCT DISTRIBUTION MODELING SYSTEM AND ASSOCIATED METHODS

GOVERNMENT INTEREST

The invention described herein may be manufactured and used by or for the Government of the United States for all governmental purposes without the payment of any royalty.

FIELD OF THE INVENTION

The present invention relates to network emulation/simulation. More specifically, this invention pertains to achieving computational efficiency for linear system modeling of networks, and associated systems and methods.

BACKGROUND OF THE INVENTION

A model is a precise, mathematical representation of the dynamics of a system used to provide insight into the behavior of that system. As a matter of definition, the term "system" refers to a set or collection of equations that can be dealt with collectively. A linear system refers to a finite set of linear equations, defined herein to include those equations that graph as straight lines in the Cartesian coordinate system. Therefore, in mathematics, a linear system is a collection of two or more linear equations involving the same set of variables. As a mathematical abstraction, linear systems have been applied advantageously in automatic control theory, signal processing, and telecommunications. For example, the propagation media for wireless communication systems may be modeled as linear systems.

Modeling solutions known in the art typically employ computational methods that seek to exercise a set of linear systems in order to test, verify, and/or observe inputs and outputs of that set of linear systems. In such methods, the linear system(s) may model naturally occurring phenomena or environments, and the inputs and outputs are often real, virtual, and/or simulated. Modeling of this type may provide a certain level of repeatability that may not be possible to obtain in real world testing, and also may maintain a reasonable level of realism that may approximate that of real world testing. These modeling solutions are referred to herein as emulators and/or simulators.

As used herein, simulation may be construed to involve replicating the general behavior of a system starting from a conceptual model. Also as used herein, emulation may be construed to involve replicating in a second system how a first system internally works considering each function and their relations. Existing wireless emulators, and some simulators, model the behavior of a given wireless network environment for purposes of testing or analyzing a wireless network design that may feature multiple radio frequency (RF) devices, be they real, simulated, or virtual.

For example, and without limitation, the block diagrams shown at FIGS. 1, 2 and 3 illustrate a generic modeling method known in the prior art. As described above, the inputs and outputs of such models may be real, virtual, and/or simulated. More specifically, the block diagram 300 shown at FIG. 2 illustrates an exemplary linear system (LS) 302. Linear systems modeled by emulators/simulators may be generally divided into two parts, as shown: an impulse response model (IRM) 310 and a model for an overall delay and gain/loss (DGLM) value 320. Such linear system models may employ the linear system operations shown in FIG. 1 (i.e., fading operations 210 each with its inputs 212 and outputs 214, a path loss operation 220 with its inputs 222 and outputs 224, a delay operation 230 with its inputs 232 and outputs 234, and combine operations 240 each with its inputs 242, 244 and output 246).

Referring now to the prior art model illustrated at FIG. 3, and continuing to refer to FIG. 2, each $K^{th}$ input 330 in a set of inputs and each $L^{th}$ output 340 in a set of outputs may have a unique and independent value for each impulse of its respective linear system 302 in the set of linear systems (specifically, for its respective IRM 310 from FIG. 2). As such, a certain amount of processing resources and time is required to model the respective IRM 310 and DGLM 320 for each of the linear systems 302 present in the model 400. The set of linear systems in such a model 400 is often calculated using some type of processing unit, such as, but not limited to, central processing units (CPUs), graphics processing units (GPUs), digital signal processors (DSPs), and field-programmable gate arrays (FPGAs).

FIG. 3A illustrates an exploded view of the model 400 of FIG. 3 that, for example, and without limitation, may model a wireless emulator characterized by only path loss 220 and propagation delay 230 (as defined above and as illustrated in FIG. 1) in a network of interest that services K transmitters (inputs) 330 and L receivers (outputs) 340. Each transmitter-receiver combination creates a path between them. Therefore, the model comprises LK paths, and each path is associated with a respective delay component Δ 230 and a respective path loss component Γ 220. Consequently, solving the set of linear systems representing such paths requires a processing resource(s) to perform LK delay operations to compute propagation delay 230 and LK multiplications to compute path loss 220. Furthermore, the processing resources must perform L (K−1) adds to combine 240 each transmitted signal at each of the respective features. A person of ordinary skill in the art will immediately recognize that as the number of transmitters and receivers increases the number of required operations increase, and, therefore a large number of transmitter-receiver combinations (e.g., RF devices) can present computational issues when modeling such a system.

Referring now to the prior art model illustrated at FIG. 3B, and continuing to refer to FIG. 3A, introducing a fading component 210 to the path loss 220 and propagation delay 230 in the model 400 described above may add another degree of computational complexity. (Note: Fading component 210, represented as δ in FIGS. 1 and 2, is characterized by k inputs, l outputs, and m multipath channels, the latter described in detail below. For illustration purposes, fading component 210, represented as h in FIG. 3B, is characterized by k inputs and l outputs only, and without accounting for multipath.) As with the path loss component Γ 220, network architects typically multiply each path by a fading component h 210 as shown in FIG. 3B. Doing so may add another LK multiplication functions to the linear system model 400 to implement fading.

Introducing multipath effects complicates the model further. In wireless telecommunications, multipath is a propagation phenomenon resulting from radio signals reaching a receiver by two or more paths. Causes of multipath may include atmospheric ducting, ionospheric reflection and refraction, and reflection from water bodies and terrestrial objects such as mountains and buildings. Introducing multipath to the linear system model 400 results in a number of multipliers equal to MLK, where M is the number of multipath components. Such a model modification also results in MLK delay operations, and (M−1) LK add operations.

A need exists for specific improvements in how a computer operates to model a set of linear systems. More specifically, a need exists for improvements in the state of the art for simulating/emulating wireless network architectures.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a product distribution modeling system and methodology that advantageously creates an efficient and effective model for a set of linear systems. The invention may comprise a wireless network emulator for a plurality K of transmitters and a plurality L of receivers using a product distribution modeling system configured for execution by at least one computer processor. A subset of the transmitters and receivers may be characterized by a plurality M of multipath components.

The wireless network emulator may comprise a modeling subsystem and a testing subsystem. The modeling subsystem may determine for each of MLK communication channels defined between K transmitters and L receivers a respective delay component, loss component, and fading component. The fading component may be determined by calculating a respective weight value for each of an $M_{in}$ count of input impulses associated with the K transmitters and an $M_{out}$ count of output impulses associated with the L receivers. Each of the weight values is of a time-varying random variable type. The modeling subsystem may then determine a signal propagation value for a modeled communication channel defined as a path between one of the K transmitters and one of the L receivers. The signal propagation value may include the delay component, the loss component, and the respective weight values of the $M_{in}$ input impulses and $M_{out}$ output impulses associated with the path defining the modeled communication channel. The testing subsystem may use the signal propagation value to receive input signals from a transmitter and to generate output signals to a receiver along the modeled communication channel.

BRIEF DESCRIPTION OF THE DRAWINGS

FIG. 3C is a table illustrating computational resources required to model simulated sets of linear equations using the exemplary model of FIG. 3.

FIG. 8 is a table illustrating computational resources required to model simulated sets of linear equations using the method of FIG. 7 compared to using the exemplary model known in the prior art of FIG. 3.

DETAILED DESCRIPTION OF THE INVENTION

Figure 1:
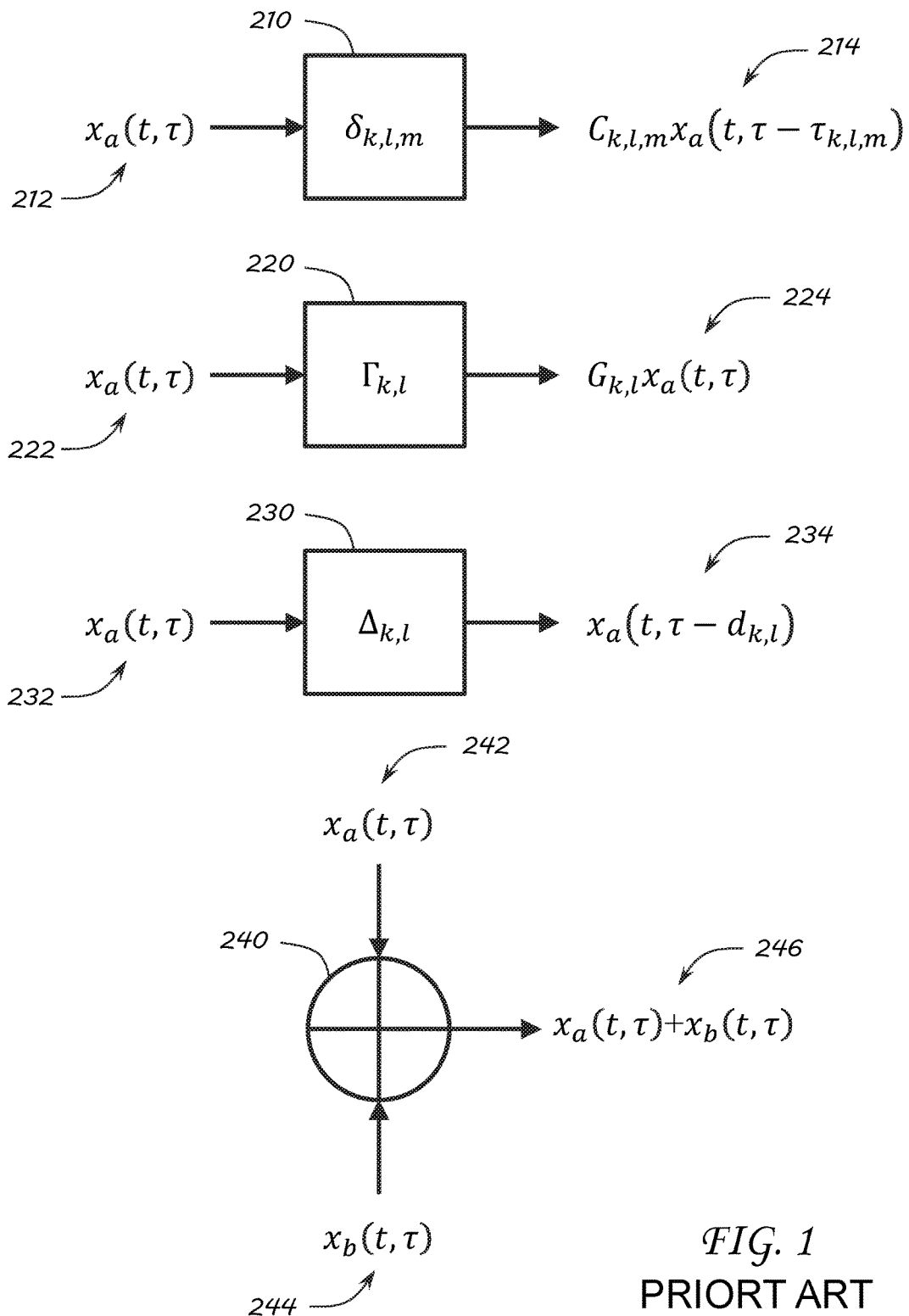
FIG. 1 is a legend of exemplary linear system operations known in the prior art.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Referring to FIGS. 4-9, a product distribution modeling system (PDMS) according to an embodiment of the present invention is now described in detail. Throughout this disclosure, the present invention may be referred to as a product distribution system, a modeling system, an emulation system, a simulation system, an emulator, a simulator, a modeler, a device, a system, a product, a service, and a method. Those skilled in the art will appreciate that this terminology is only illustrative and does not affect the scope of the invention. For instance, the present invention may just as easily relate to network benchmarking technology.

An embodiment of the invention, as shown and described by the various figures and accompanying text, provides an automated system for receiving parameters of a network of interest, and creating a product distribution model of that network of interest. The system and method according to an embodiment of the present invention may advantageously generate automated linear system models (i.e., stochastic processes of response impulses between inputs and outputs) for use in simulators/emulators to effectively represent real-world phenomena or events. The system and method according to an embodiment of the present invention also may advantageously create efficient model implementations that require significantly reduced processing time and resources compared to known implementations. The system and method according to an embodiment of the present invention also may advantageously deliver such model effectiveness and efficiency for any configuration of processing units, including single, multi-single, and multi-core computers.

Figure 4:
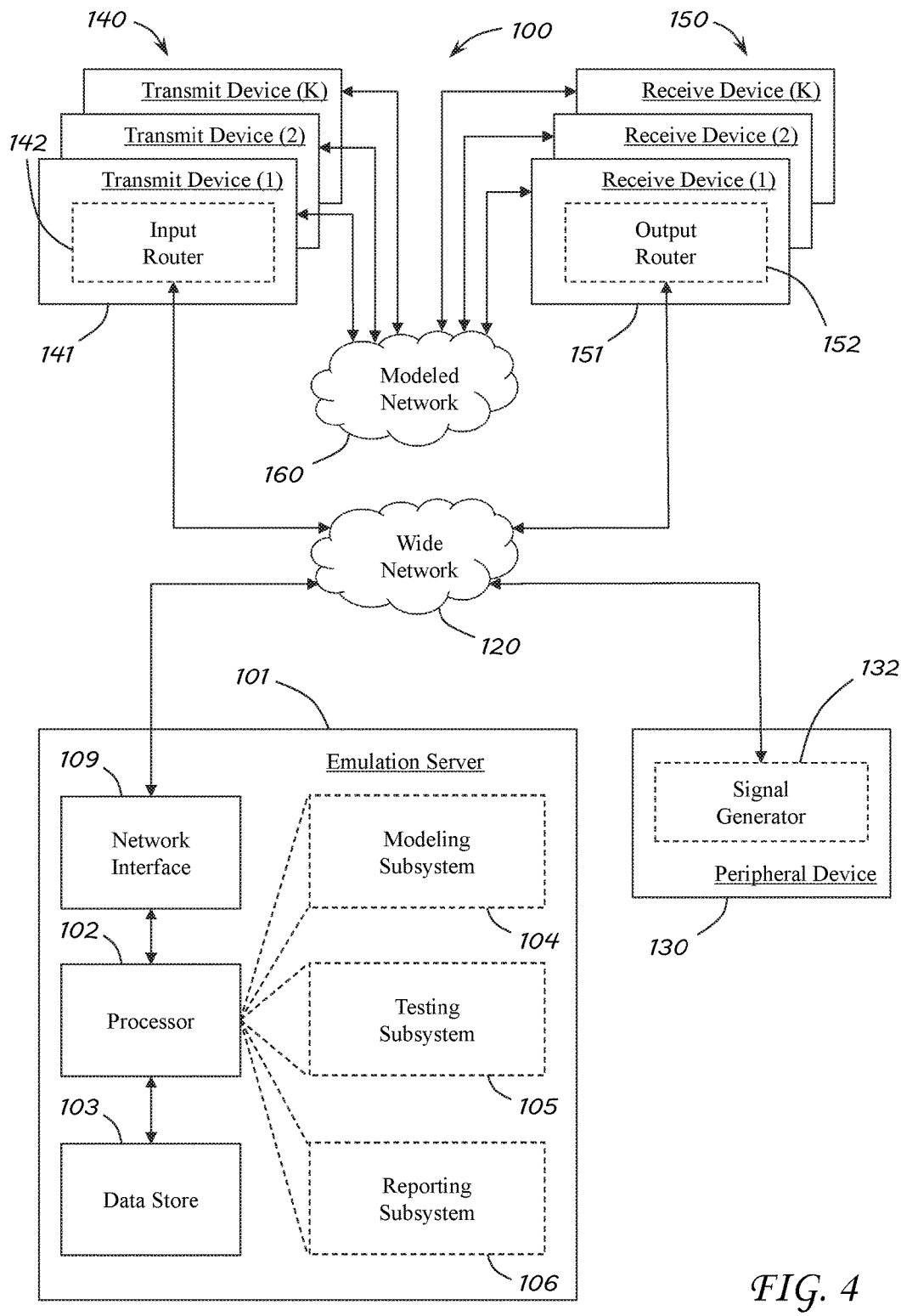
FIG. 4 is a schematic block diagram of a product distribution modeling system (PDMS) according to an embodiment of the present invention.

Referring now to FIG. 4, for example, and without limitation, a Product Distribution Modeling System (PDMS) 100, according to an embodiment of the present invention, may include an Emulation Server 101 which may be in data communication with a Peripheral Device 130. The Emulation Server 101 also may be in data communication with a plurality of networked devices including some number K of transmit devices 140 in data communication with some number L of receive devices 150. Two or more of each of the Peripheral Device 130, the networked devices 140, 150, and the Emulation Server 101 may be in data communication using a network connection to a wide area network 120, such as the Internet. A Peripheral Device 130 also may be configured in direct data communication (not shown) to the Emulation Server 101.

The PDMS 100 may be configured to advantageously model behavior of a network of interest. As a matter of definition, the network of interest may comprise impulse responses communicated among multiple inputs and multiple outputs in a configuration that lends itself to linear system modeling. For example, and without limitation, such linear system modeling may be practically applied to emulation/simulation of the exchange of signals among transmitters and receivers across a wireless network. In one embodiment, the PDMS 100 may be employed to advantageously model a network of interest that is an actual network (e.g., a Modeled Network 160 that may convey signals among physically-deployed Transmit Devices 140 and Receive Devices 150). In another embodiment, the PDMS 100 may be employed to advantageously model a network of interest that is a conceptual network (e.g., a mathematical representation of intercommunication among logical and/or virtual input and output sources as described and communicated to the Emulation Server 101 using the Peripheral Device 130). In yet another embodiment, a network of interest may be some combination of an actual network and a conceptual network as described above.

Continuing to refer to FIG. 4, in more detail, the Emulation Server 101 may comprise a processor 102 that may be operable to accept and execute computerized instructions, and also a data store 103 which may store data and instructions used by the processor 102. More specifically, the processor 102 may be positioned in data communication with the Peripheral Device 130 and/or some number of the networked devices 140, 150. The processor 102 may be configured to direct input from other components of the PDMS 100 to the data store 103 for storage and subsequent retrieval. For example, and without limitation, the processor 102 may be in data communication with external computing resources, such as the Peripheral Device 130 and the networked devices 140, 150, through a direct connection and/or through a network connection to the wide area network 120 facilitated by a network interface 109.

For example, and without limitation, the computerized instructions may be configured to implement a Modeling Subsystem 104, a Testing Subsystem 105, and a Report Generation Subsystem 106, each of which may be stored in the data store 103 and retrieved by the processor 102 for execution. The Modeling Subsystem 104 may be operable to create a product distribution model of a network of interest as a system of linear equations. The Testing Subsystem 105 may be operable to execute the linear system model created by the Modeling Subsystem 104. The Report Generation Subsystem 106 may be operable to format and display behavior indicators for the linear system model as executed by the Testing Subsystem 105.

The Peripheral Device 130 may comprise, for example, and without limitation, an interface for identifying characteristics of a network of interest that may be communicated to the Emulation Server 101 for use in modeling of that network of interest. The Peripheral Device 130 may employ a Signal Generator 132 that may be operable to provide sample impulses to be introduced by the Emulation Server 101 to the linear system model created by the Modeling Subsystem 104 during execution of that linear system model by the Testing Subsystem 105. Also for example, and without limitation, the Peripheral Device 130 may communicate with an Input Router 142 of a Transmit Device 141 and/or an Output Router 152 of a Receive Device 151, each operable to provide real-world impulses to the Emulation Server 101. In one embodiment, the Emulation Server 101 may use these real-world impulses to model behavior of the modeled network 160 of which the networked devices 140, 150 are a part. In another embodiment, the Emulation Server 101 may introduce these real-world impulses to model their impact on behavior of a linear system model created by the Modeling Subsystem 104 that is unrelated to the network 160 of which the networked devices 140, 150 are a part.

As described above, the Transmit Devices 140 and the Receive Devices 150 may comprise K signal-generating transmitters and L signal-receiving receivers configured in data inter-communication using the Modeled Network 160 that may define a wireless network. For example, and without limitation, a user of the Peripheral Device 130 may be a network architect responsible for designing, implementing, optimizing, and/or troubleshooting computer-implemented networks. The network architect may interact with various components included in the PDMS 100 through the Peripheral Device 130. For example, and without limitation, any person generally responsible for modeling of complex linear systems that are dependent on information flow may be a user of the system 100.

Those skilled in the art will appreciate that the present invention contemplates the use of computer instructions and/or systems configurations that may perform any or all of the operations involved in network modeling, including visualization, testing, and analysis. The disclosure of computer instructions that include Modeling Subsystem 104 instructions, Testing Subsystem 105 instructions, and Report Generation Subsystem 106 instructions is not meant to be limiting in any way. Also, the disclosure of systems configurations that include Emulation Server(s) 101, Peripheral Device(s) 130, Transmit Devices 140, Receive Devices 150, and/or Modeled Networks 160 is not meant to be limiting in any way. Those skilled in the art will readily appreciate that stored computer instructions and/or systems configurations may be configured in any way while still accomplishing the many goals, features and advantages according to the present invention.

As described in detail below (see, for example, FIG. 9), the PDMS 100 according to certain embodiments of the present invention may be used to model the stochastic process of impulse responses used in the simulation or emulation of a set of linear systems between multiple inputs and outputs, while significantly reducing the amount of processing resources and time needed to do this type of modeling. Modeling methods known in the art (e.g., the method illustrated in FIGS. 1, 2, 3, 3A, 3B, and 3C) typically independently model each impulse in the impulse response for every linear system in the set. For example, if a set consisted of 100 linear systems (i.e., 100 impulse responses) and each impulse response consisted of 16 impulses, the total number of impulses to model would be 1600. Given this same system of linear equations, the present invention advantageously may reduce the number of independent impulses to model to 40 impulses (i.e., the square root of 1600) by invoking dependency between all the impulses in the set of linear systems (e.g., the 1600 impulses in the example would be dependent on one another, not independent), and by otherwise maintaining all other properties of the stochastic process (i.e., correlation properties and probability density function attributes) through use of a uniquely-designed product distribution for the respective stochastic processes.

A person of skill in the art will recognize that the modeling constructs of FIGS. 1, 2, 3, 3A, and 3B may be transformed to show a frequency domain representation and may be varied by shifting blocks around while obeying the properties of linear systems. These transformations and variations may improve computational performance of a model with regards to reducing processing resources and time.

A person of skill in the art will also recognize that performing linear system modeling in the frequency domain instead of the time domain may improve performance when executed on an adequate parallel processing unit. Using such parallel processing, an impulse response model (as exemplified in FIG. 2 as IRM 310) may be converted to a transfer function model (TFM) which does not require summations and delays, but instead requires only weighting, thus reducing the processing time required for model execution.

Figure 2:
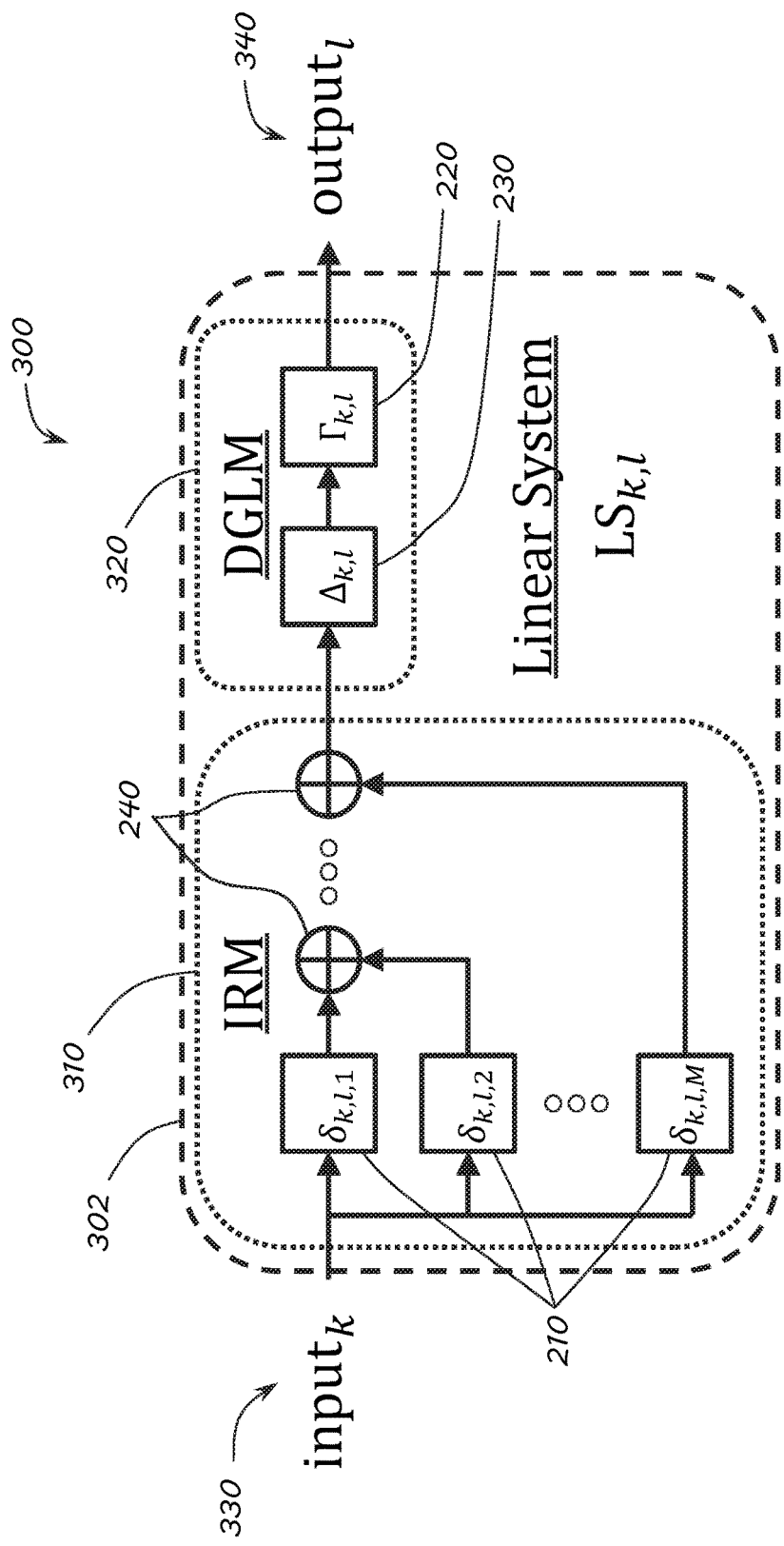
FIG. 2 is a schematic diagram of an exemplary linear system known in the prior art and employing the exemplary linear system operations of FIG. 1.

A person of skill in the art will also recognize that an IRM 310, as exemplified in FIG. 2, is of a finite impulse response. With an infinite impulse response, a similar finite impulse response may be created, which may reduce the processing resources needed while maintaining the effects of the linear system.

Figure 5:
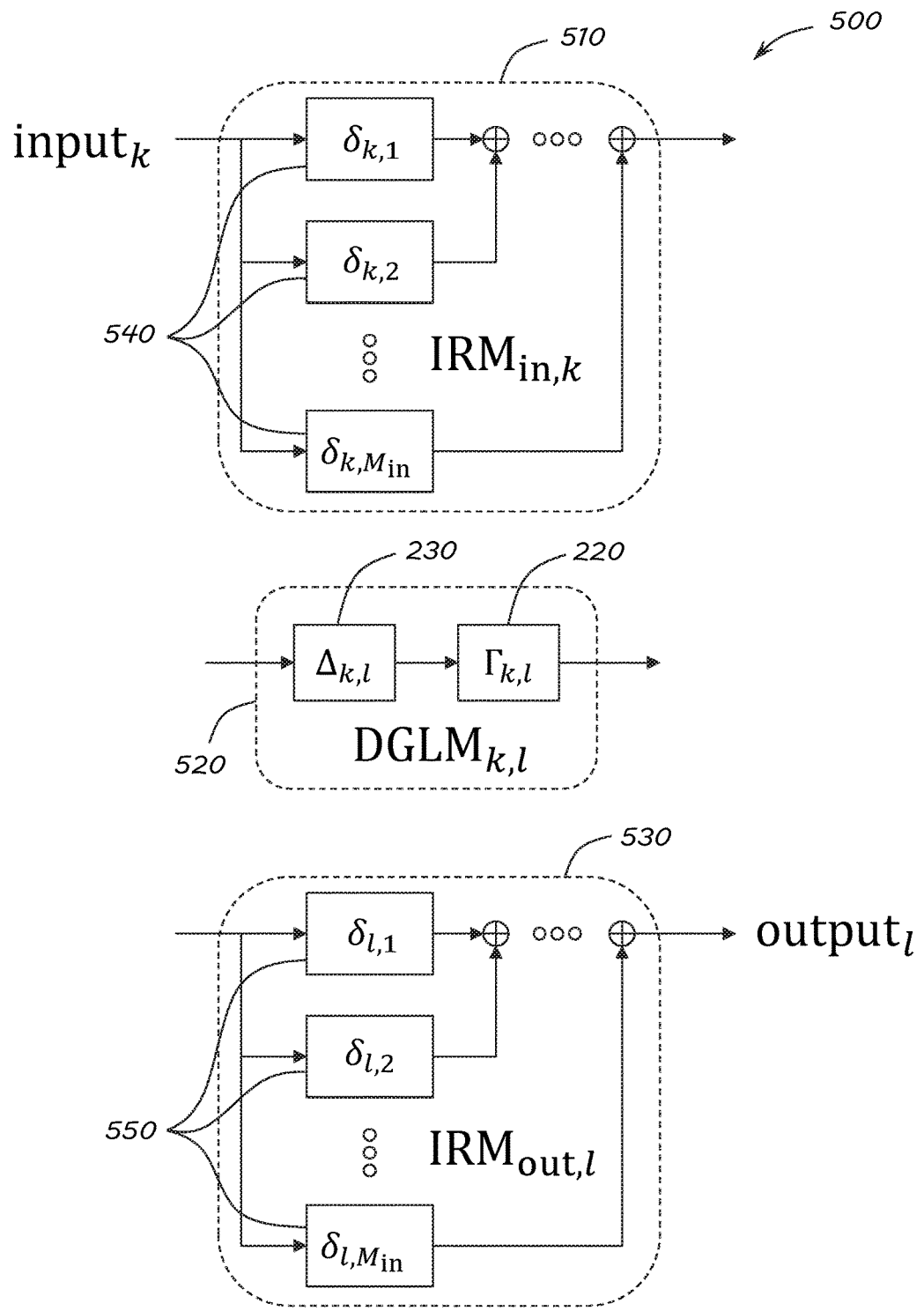
FIG. 5 is a schematic diagram of a linear system according to an embodiment of the present invention.

A method aspect of the present invention may significantly reduce processing resources and time required of a computer processing unit to accomplish the multiplications, adds, and delays needed to model IRMs in a set of linear systems. The present method may comprise a set linear operations designed to create a set of linear systems that may model naturally occurring phenomena or environments. This set of linear operations may be uniquely applied to reduce computation while maintaining the fidelity of the model. More specifically, the block diagram 500 shown at FIG. 5 illustrates an exemplary linear system representation according to an embodiment of the present invention. The linear system of interest may be divided into three parts, as shown: an input impulse response model (IRM) 510, a model for an overall delay and gain/loss (DGLM) 520, and an output impulse response model (IRM) 530. The DGLM model 520 may employ the linear system operations shown in FIG. 1 for path loss 220 and delay 230. However, this method may apply the input and output IRMs 510, 530 to reduce the processing time and resources needed to implement fading on input 540 and fading on output 550 (as compared to fading and combine operations 210, 240 required by the prior art IRM 310 in FIG. 2). The processing time and resources needed for the DGLM 520 calculation in the present invention will remain the same as the DGLM 320 calculation in the prior art model of FIG. 2.

As described above, to achieve the desired advantage of processing economy, the method aspect does not independently calculate all impulses in a set of impulse responses. Instead, the method may use a few independent impulses to approximate all the impulses within a set of impulse responses. More specifically, the present invention may approximate the effects of complex fading scenarios within a modeled network through the calculation and use of a respective pair of finite impulse responses associated with the input 510 and output 530 of each modeled communication channel. In certain embodiments of the present invention, the method aspect may calculate the impulse response pairs by inversely solving for product distributions and/or summations of product distributions (as described in detail below) to create the stochastic process for the respective linear system models.

Figure 6:
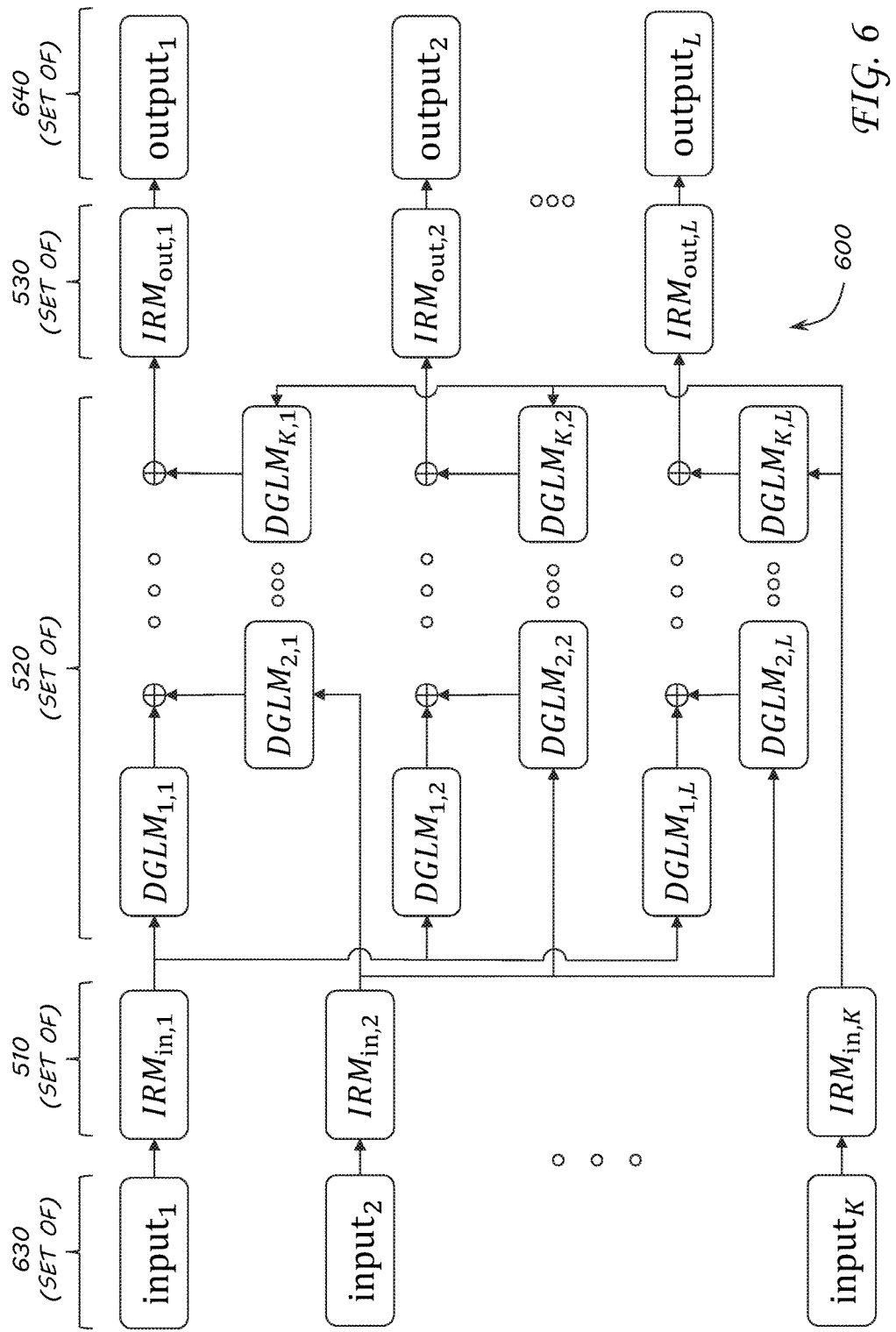
FIG. 6 is a schematic diagram of a model of the linear system of FIG. 5 according to an embodiment of the present invention.

The method aspect may send each input through (i.e., convolve or multiply the input with) an IRM or TFM associated with that input. As illustrated in FIG. 6, for example, and without limitation, if the system 600 is configured for K inputs 630 then the system will exhibit K impulse responses 510, one for each input. Each of these inputs 630 convolved with the impulse response 510 or multiplied with the transfer function may be sent through a DGLM 520 associated with each respective input-output pair. Consequently, if the system 600 is configured for K inputs 630 and L outputs 640, then the system will exhibit KL input-output pairs and one DGLM for each. Each of these input-output pairs coming from the respective DGLM from the set 520 may then be grouped by the outputs and summed together (i.e., all the input-output pairs that have the same $L^{th}$ output from the set 530 as one of the pair may be summed together). This sum of input-output pairs may then be sent through an IRM or TFM associated with the output. There would be one IRM or TRM from the set 530 for each of the L outputs 640. Although exemplary embodiments of the present invention are described herein as using IRM in the method, a person of skill in the art would immediately recognize that the disclosed method may be designed to employ either an IRM or a TFM.

For example, and without limitation, an exemplary configuration of an emulator/simulator that uses the method according to an embodiment of the present invention is shown in the block diagrams illustrated in FIGS. 5 and 6.

More specifically, as illustrated in FIG. 6, the present method may accommodate multiple inputs 630 and multiple outputs 640 and may be most efficient when many inputs and outputs are to be modeled. After assessing the number adds, multipliers, and delays needed to implement traditional IRMs 302 in FIG. 3 as compared to input and output impulses (IRMs) 510, 530 in FIG. 6, a significant difference in the required calculations may be evident to a person of skill in the art. This difference may advantageously reduce processing resources and time.

As described below, certain embodiments of the present method may be used to model a fading characteristic (e.g., variation of the attenuation of a signal) and/or a multipath (a special case of fading) of a set of linear systems within a simulator and/or emulator of a wireless radio frequency environment. The design of the impulse response model may represent these phenomena that occur within a wireless radio frequency environment. Modeling the multipath and fading for several inputs and outputs (transmitters and receivers) is often complex, requires a lot of time and resources. The present method may advantageously reduce this complexity.

Use of a product distribution model according to an embodiment of the present invention to create the fading statistic for a multi-channel system is now described in detail. To explain the product distribution modeling process, a Rayleigh fading wireless environment without multipath will be discussed, as well as the prior art model of FIGS. 3A and 3B (for comparison purposes) and the product distribution model of the present invention as illustrated in FIG. 6A.

Figure 3:
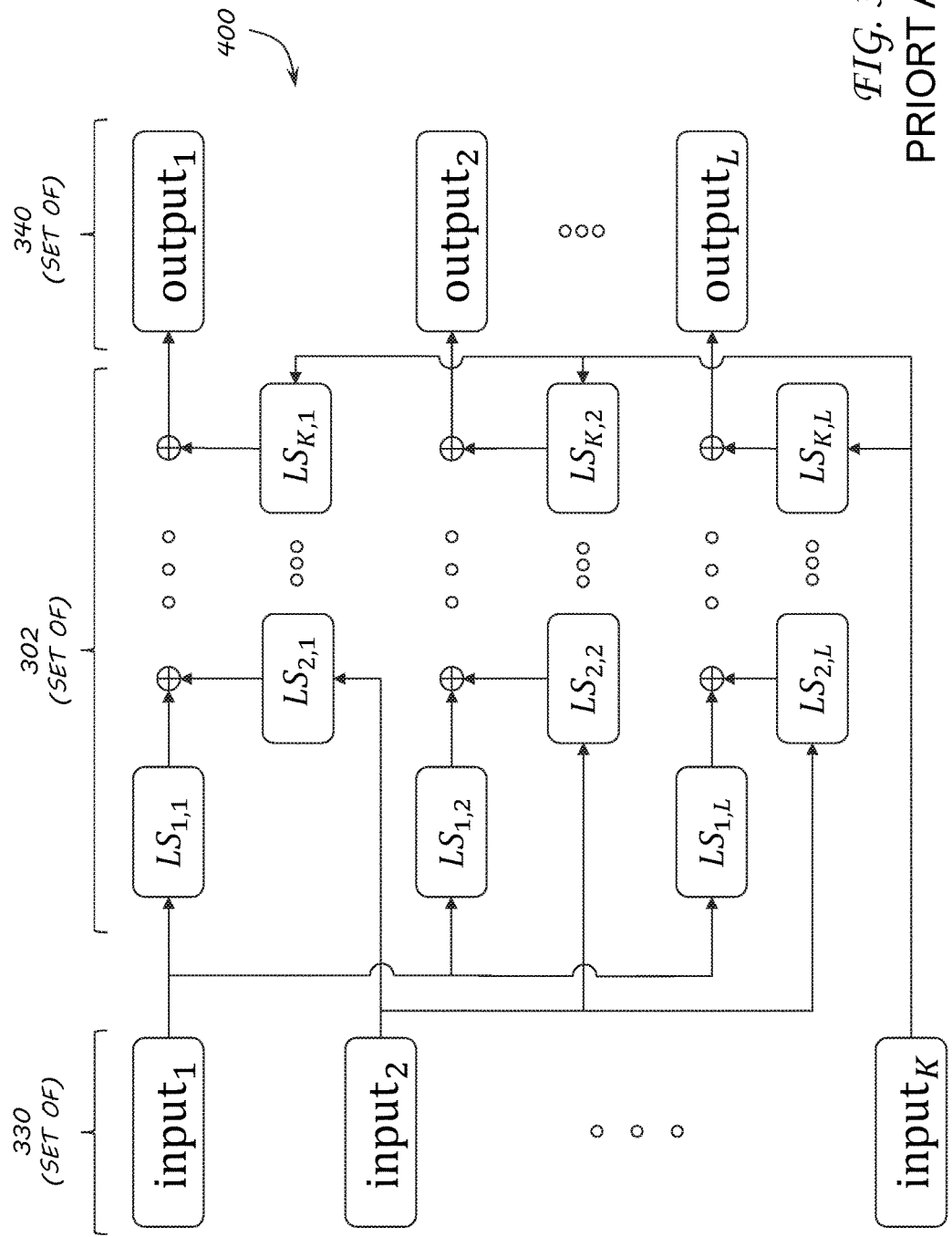
FIG. 3 is a schematic diagram of an exemplary model known in the prior art and employing the exemplary linear systems of FIG. 2.
Figure 3A:
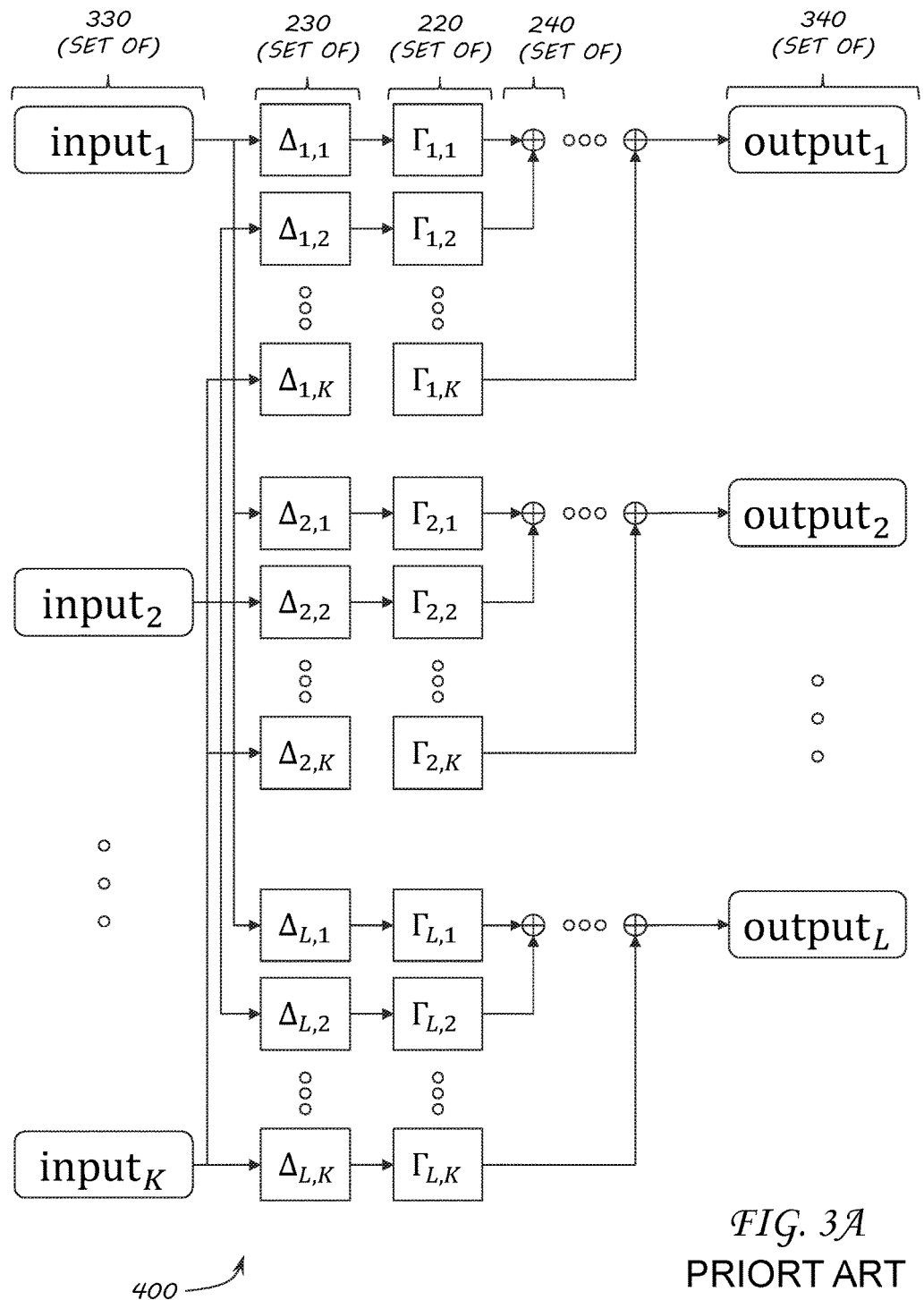
FIG. 3A is a schematic diagram of the exemplary model of FIG. 3 implementing path loss and propagation delay.
Figure 3B:
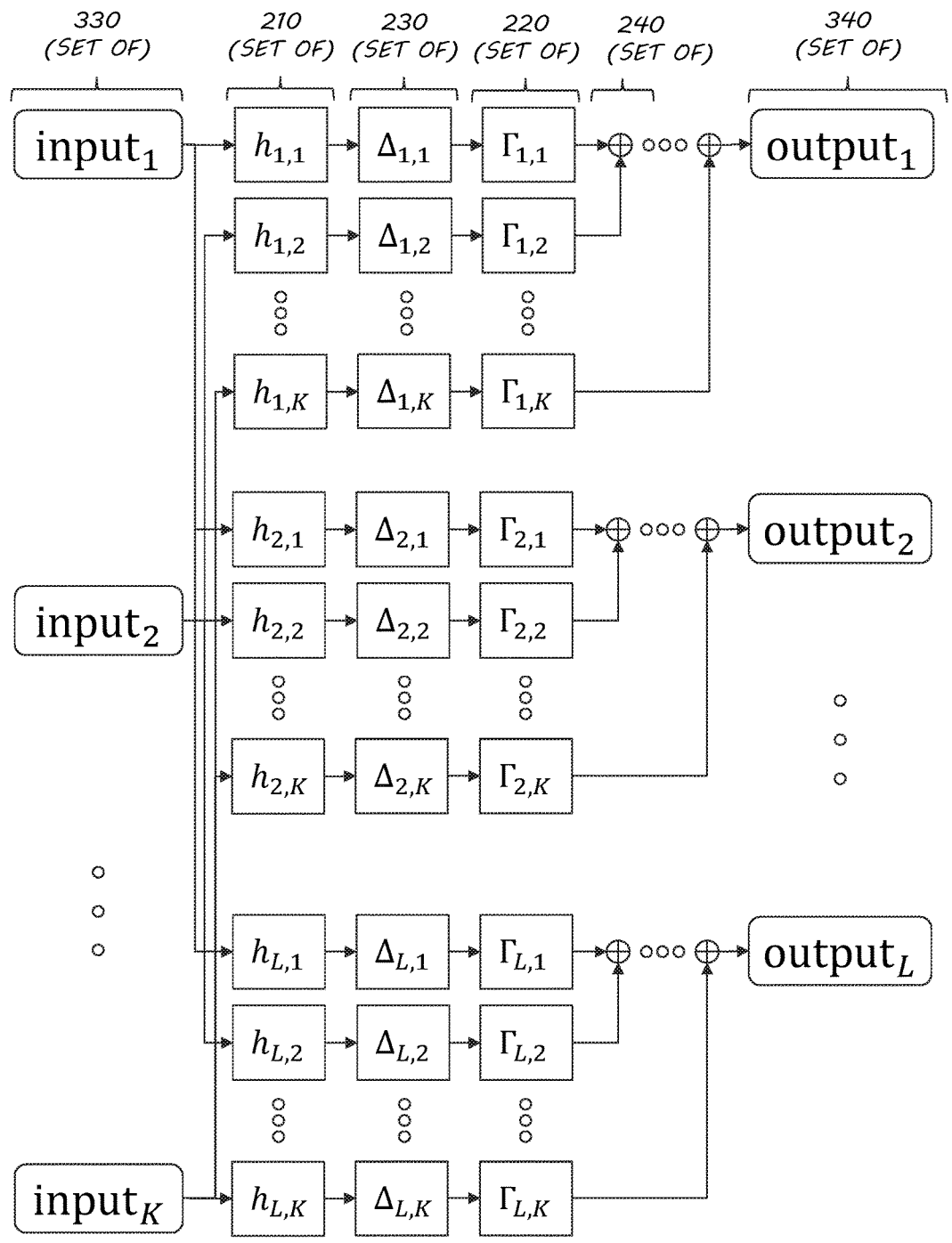
FIG. 3B is a schematic diagram of the exemplary model of FIG. 3 implementing fading, path loss, and propagation delay.

To compute the fading statistic for the prior art model of FIG. 3B, each path present in system 400 may be multiplied by a variable $h_{l,k}$ 210 (i.e., fading operation). Because the wireless environment may be characterized by Rayleigh fading, $h_{l,k}$ 210 must be a zero mean Gaussian random variable with variance $\sigma_h$. Also, when all of the receivers 340, transmitters 330, or both are not collocated with respect to the spatial coherence of the channel, the $h_{l,k}$ random variables 210 may become independent and identically distributed (i.i.d.) random variables, meaning that each random variable has the same probability distribution as the others and all are mutually independent.

Figure 6A:
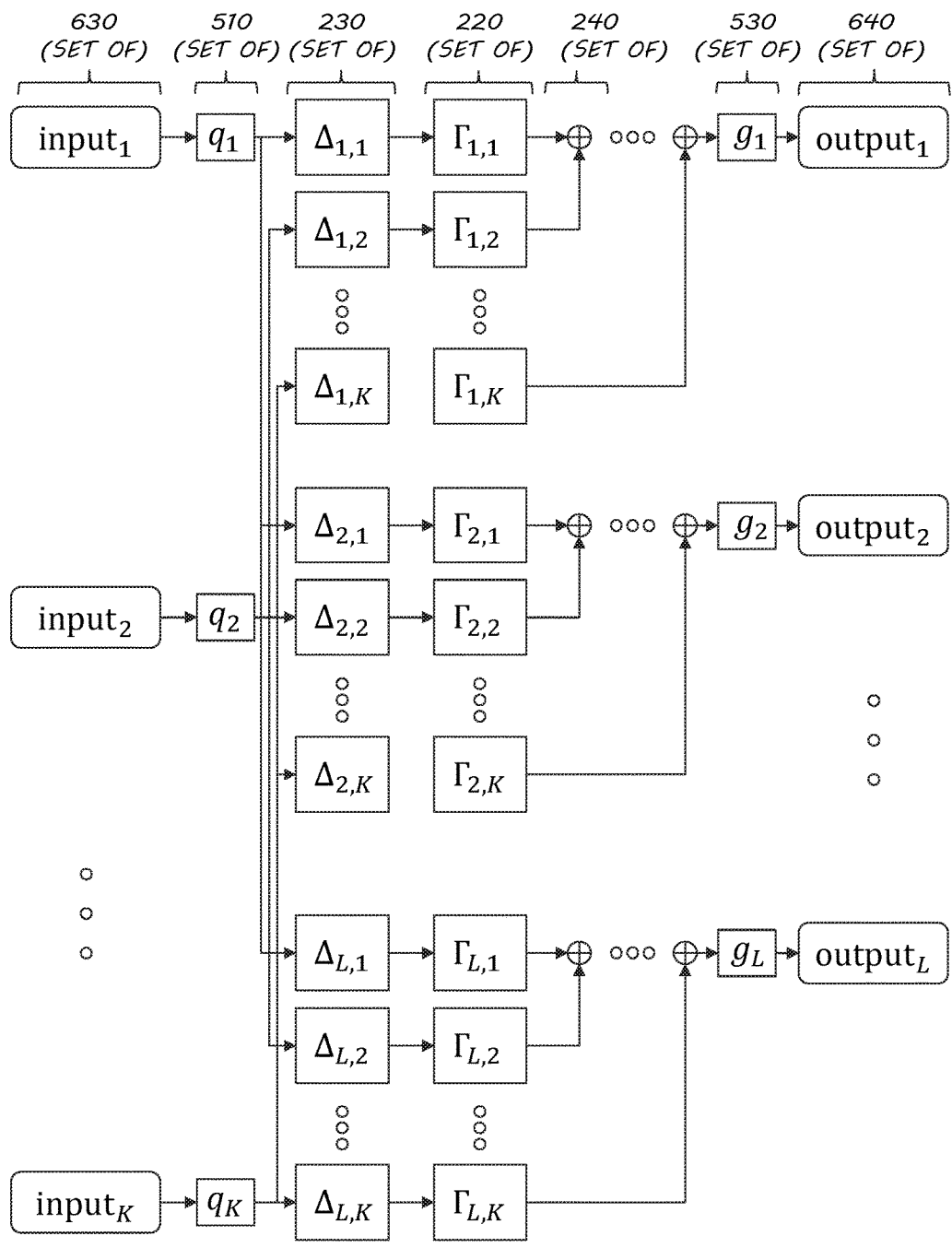
FIG. 6A is a schematic diagram of the model of FIG. 6 implementing fading, path loss, and propagation delay.

In the model according to an embodiment of the present invention, as illustrated in FIG. 6A, each path present in system 600 and defined among K inputs and L outputs may be multiplied by $g_l$ in the set of 530 and $q_k$ in the set of 510 to introduce an approximation of the overall channel impulse response along each path. Therefore, in order for the model to be a Raleigh fading wireless environment, the product of the random variables $g_l$ 530 (more specifically, fading on output $\delta_{l,mout}$, as illustrated at 550 in FIG. 5) and $q_k$ 510 (more specifically, fading on input $\delta_{k,min}$, as illustrated at 540 in FIG. 5) must be a zero mean Gaussian random variable with variance $\sigma_h$. However, complete independence between all channels may not be obtained, but all channels may be designed to be uncorrelated.

A person of skill in the art will immediately recognize that, taking multipath into consideration in addition to the more simplistic attenuation-based fading, the model 600 illustrated in FIG. 6A may require [(M+1)/2] L+[M/2] K multiply operations and the same number delay operations, and then may also require ([(M+1)/2]−1) L+([M/2]−1) K add operations. Compared to the total operations required for the traditional modeling approach of FIG. 3B, the model of FIG. 6A may represent a significant reduction in processing and time (for example, and without limitation, exemplary operations reductions 802 for various numbers 804 of transmitters, receivers, and taps present in a modeled network are illustrated in FIG. 8). Additionally, the improved model implementation described herein may advantageously separate processing of fading and multipath from the processing of path loss 220 and/or propagation delay 230. For example, and without limitation, a first processing unit may perform computations directed to path loss 220 and propagation delay 230, and respective processing units at each of the transmitters and receivers to perform the processing to model the fading and multipath (that is, fading/multipath on input 510 and fading/multipath on output 530).

In the equations presented below, multipath fading is considered in more detail. The signals from the various transmitters may be convoluted with various impulse responses that may represent the respective channel impulse responses. For the prior art model 400 in FIG. 3B, the received signals 340 at the end of a communication path may be represented by the following equation that shows a summation of transmitted signals 330:

$$y_l(t_n, \tau) = \sum_{k=1}^{K} G_{k,l} h_{k,l}(t_n, \tau) * x_k(t_n, \tau - d_{k,l})$$

where $y_l(t_n,\tau)$ corresponds to each $L^{th}$ output 340 in a set of outputs,
where $G_{k,l}$ corresponds to a path loss component 220,
where $h_{k,l}(t_n,\tau)$ corresponds to a fading component 210 (i.e., channel impulse response),
where $x_k$ corresponds to each $K^{th}$ input 330 in a set of inputs, and
where $d_{k,l}$ corresponds to a delay component 230 (i.e., overall path delay).

The channel impulse response, $h_{k,l}$ in the preceding equation may be represented by the following equation:

$$h_{k,l}(t, \tau) = \sum_{n=1}^{N} \sum_{m=1}^{M} A_{k,l,m,n} \delta(t - t_{k,l,n}, \tau - t_{k,l,m})$$

where $h_{k,l}(t,\tau)$ corresponds to a fading component 210, and
where $A_{k,l,m,n}$ corresponds to a fading operation output 214 (as illustrated in FIG. 1).

For the model 600 according to an embodiment of the present invention, as illustrated in FIG. 6A, the received signals 640 at the end of a communication path may be represented by the following equation:

$$y_l(t_n, \tau) = \sum_{k=1}^{K} G_{k,l} q_k(t_n, \tau) * g_l(t_n, \tau) * x_k(t, \tau - d_{k,l}) =$$

$$g_l(t_n, \tau) * \left[ \sum_{k=1}^{K} G_{k,l} q_k(t_n, \tau) * x_k(t, \tau - d_{k,l}) \right]$$

where $y_l(t_n,\tau)$ corresponds to each $L^{th}$ output 640 in a set of outputs,
where $G_{k,l}$ corresponds to a path loss component 220,
where $q_k(t_n,\tau)$ corresponds to K impulse responses 510, one for each input,
where $g_l(t_n,\tau)$ corresponds to L impulse responses 530, one for each output,
where the product of $q_k(t_n,\tau)$ and $g_l(t_n,\tau)$ corresponds to an approximation (referred to herein as $\hat{h}_{k,l}(t_n,\tau)$) of the fading component 210 as computed in the prior art illustrated in FIG. 3B,
where $x_k$ corresponds to each $K^{th}$ input 630 in a set of inputs, and
where $d_{k,l}$ corresponds to a delay component 230 (i.e., overall path delay).

The impulse responses, $g_l$ 530 and $q_k$ 510, and channel impulse response approximating 210, $\hat{h}_{k,l}$, as shown in the preceding equation, may be represented by the following equation (Note: The time value may be set to a constant and removed from the equation for notational convenience and clarity):

$$\hat{h}_{k,l}(\tau) =$$
$$\int_{-\infty}^{\infty} \left[ \sum_{m_{in}=1}^{M_{in}} A_{in,k,m_{in}} \delta(\gamma - \tau_{in,k,m_{in}}) \right] \left[ \sum_{m_{out}=1}^{M_{out}} A_{out,l,m_{out}} \delta(\tau - \tau_{out,k,m_{out}} - \gamma) \right]$$
$$d\gamma = \sum_{m_{in}=1}^{M_{in}} \sum_{m_{out}=1}^{M_{out}} A_{in,k,m_{in}} A_{out,l,m_{out}} \delta(\tau - \tau_{in,k,m_{in}} - \tau_{out,l,m_{out}})$$

where $\hat{h}_{k,l}(c)$ approximates fading component 210 (i.e., channel impulse response), and where $A_{in,k,min}$ $A_{out,l,mout}$ approximates a fading operation output 214.

In some cases, it may not be possible to exactly match the prior art channel impulse response with the channel impulse response approximated using the present invention (that is, to model $h_{k,l} = \hat{h}_{k,l}$). However, it may be possible to have the following property:

$$Pr[a \leq \hat{h}_{k,l} \leq b] = Pr[a \leq h_{k,l} \leq b] \text{ for any } a \text{ and } b$$

In the case of the Rayleigh fading channel, one of the most challenging and important calculations may be to solve the inverse of the product distribution, as follows (Note: For Rayleigh fading channels, $B_{k,l}$ must be a zero mean complex distribution):

$$B_{k,l} = A_{in,k,l,m_{in}} A_{out,l,m_{out}}$$

where $B_{k,l}$ approximates a fading operation output 214.

At this point in the calculation, the random variable is known and the random variables may be assumed to be the i.i.d. random variables, identical with known dependency, or the distribution one and the dependency is known. Armed with this information, an embodiment of the present invention may determine the distribution for and/or may use that information in the respective equations described above. In this manner, the product distribution may successfully represent the statistics of the wireless fading channel with multipath.

Figure 7:
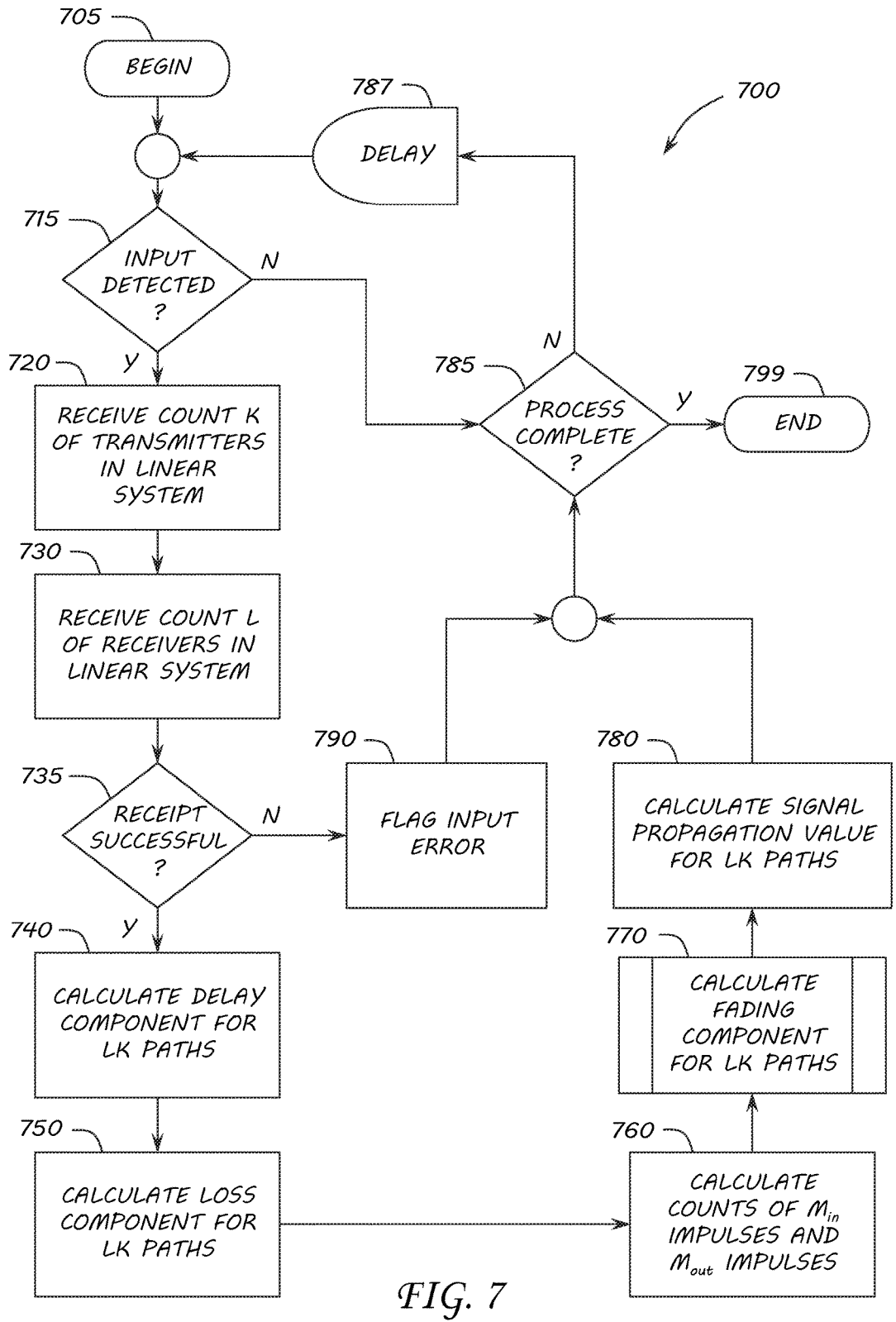
FIG. 7 is a flow chart illustrating a method of modeling a linear system according to an embodiment of the present invention.

Referring now to FIG. 7, a flow chart 700 of the process by which to implement product distribution modeling will now be discussed in detail. A person of skill in the art will immediately recognize the order of certain steps may be changed or performed in parallel. From the start at Block 705, the Modeling Subsystem 104 of the Emulation Server 101 may poll for input (Block 715). While awaiting input, the Modeling Subsystem 104 may cycle through timed delays 787 and poll for a directive to end the program (Blocks 785 and 799).

If, at Block 715, input is detected, the Modeling Subsystem 104 may receive a count K of transmitters (Block 720) and a count L of receivers (Block 730) for which a linear system is to be modeled. Failed receipt of required and/or valid input at Block 735 may result in the Reporting Subsystem 106 flagging the input error (Block 790) before the Modeling Subsystem returns to cycling (Blocks 785, 787, and 799).

The Modeling Subsystem 104 may employ valid input to calculate a delay component 230 (Block 740) for LK paths and to calculate a loss component 220 (Block 750) for LK paths, both to be assigned the impulses in the input and output IRMs (510 and 530, respectively). These values may be assigned in a way that may generate the proper delay spacing between the M impulses in the overall impulse response that models the phenomena or environment.

At Block 760, the Modeling Subsystem 104 may calculate a number of impulses ($M_{in}$, $M_{out}$) associated each of the inputs and the outputs, respectively. An objective of the present modeling solution may be to have M equal to the total number of impulses required to best model the phenomena or environment represented by the set of linear systems. The variable M may be the total number of impulses generated from the convolution of $IRM_{in,k}$ 510 with $IRM_{out,l}$ 530. In this manner, the method aspect of the present invention may, for a given set of inputs 630 and outputs 640, determine a reduced number of impulses ($M_{in}$, $M_{out}$) required to effectively model a set of linear systems compared to prior art modeling solutions described above.

At Block 770, the Modeling Subsystem 104 may calculate for each of the in impulses ($M_{in}$, $M_{out}$) a respective weight value, of a time-varying random variable type. Defining these weights may approximate fading components 210 for each of the impulses in the input 510 and output 530 IRMs (e.g., LK paths through the modeled system). The respective products and summations of these random variables (resulting from the subsequent convolution of the input 510 and output 530 IRMs) may yield a respective stochastic process for each impulse that may successfully model the naturally occurring phenomenon or environment (Block 780). More specifically, the calculation by the Modeling Subsystem 104 may produce a signal propagation value that may include the loss component 220, the delay component 230, and the respective weight values of the $M_{in}$ input impulses 510 and $M_{out}$ output impulses 530 associated with the path defining a particular modeled communication channel in the linear system of interest.

At this point in the process of FIG. 7, the Testing Subsystem 105 may operate to place the computed loss 220 and delay 230 values, along with the weighted values of the $M_{in}$ input impulses 510 and $M_{out}$ output impulses 530, into the model 600 shown in FIG. 6A. For example, and without limitation, the resultant executable model 600 may be executed using one or more processing units (e.g., CPUs GPUs, FPGAs, DSPs). By injecting inputs into the model using the Signal Generator 132 of the Peripheral Device 130 and/or the Input Router 142 of a Transmit Device 141 (e.g., physical, logical, and/or virtual), the modeled outputs may be affected as if the model was subjected or exposed to the phenomenon or environment in the network of interest. Behavior factors may be captured during execution of the created model, and displayed or otherwise output using the Reporting Subsystem 106.

In an alternative embodiment of the present invention, the method 700 described above may be executed on many different processing units, and there could be one or multiple processing units that implement this method. The actual implementation in that processing unit will be dependent on the processing unit and the coding platform and syntax used. Overall, what is accomplished by any of the implementations on any processing setup is what is shown in the model 600 of FIG. 6A.

In other alternative embodiments of the present invention, the method steps of Blocks 740, 750, 760, and 770 may be changed in sequence or executed simultaneously without deviating from the advantageous application of the invention. In another alternative embodiment, the present invention may operate in the frequency domain and using TFMs.

This invention may be practically applied to any area that uses linear systems to model phenomena and environments. In particular, use of the automated method is envisioned for, but not limited to, modeling of wireless radio frequency environments. Many fields of study and technologies use linear systems to model various phenomena, and in scenarios whereby several inputs and outputs make up a linear system, modeling such a system may be expected to require significant amounts of resources and time to implement the impulse response models for the set of linear systems. The present invention may advantageously help reduce the amount of time and resources needed to perform this type of modeling for any of the respective linear systems.

To analyze the concept that the invented method that uses product distribution modeling for a set of linear systems may significantly reduce processing resources and times, a fully connected wireless network was employed for benchmark testing. Referring now to FIG. 3C, the test network used was configurable 404 with 2, 4, 8, or 16 transmitters, 2, 4, 8, or 16 receivers, and an impulse response model between transmitter-receiver pairs represented by 4, 16 or 64 impulses (taps) weighted by a zero mean complex normal random variable (Rayleigh fading).

Still referring to FIG. 3C, the respective adds, delays, and multipliers (ADMs) needed to create the IRM may be tallied 402 for the prior methods above (FIGS. 1, 2, 3, 3A, and 3B). Referring additionally to FIG. 8, the invented method (FIGS. 5, 6, and 6A) was configured 804 similar to the prior art (FIG. 3C) for comparison purposes. The number of ADMs gives an indication of the amount of time and resources needed for the processing unit to perform required calculations. As shown in FIG. 3C, the amount of time and resources are proportional to the number of ADMs used, such that when the number of ADMs increases the amount of resources or time needed also increases. Referring now to the table at FIG. 8, illustrated is the reduction percentage 802 of ADMs used for 12 different cases taken from the fully connected network example. In the case of 16 transmitters, 16 receivers, and 64 taps for each of the IRMs, for example, and without limitation, an approximate reduction of 98.55% in the number of ADMs used in the model may be realized. Referring additionally to the table at FIG. 3C, the reduction percentage compared to prior art models may equate to 47936 fewer ADMs.

Another concept is that the statistics excluding independency of the weight value of the impulse may be maintained in a model created using the system 100 and method of the present invention. In the case of Rayleigh fading, of particular interest are random variables whose product is equal to a zero mean normal complex random variable. If so, use of the computer-implemented method according to an embodiment of the present invention makes it possible to determine what that random variable is and its distribution. This shows that the weight value concept is plausible.

Figure 9:
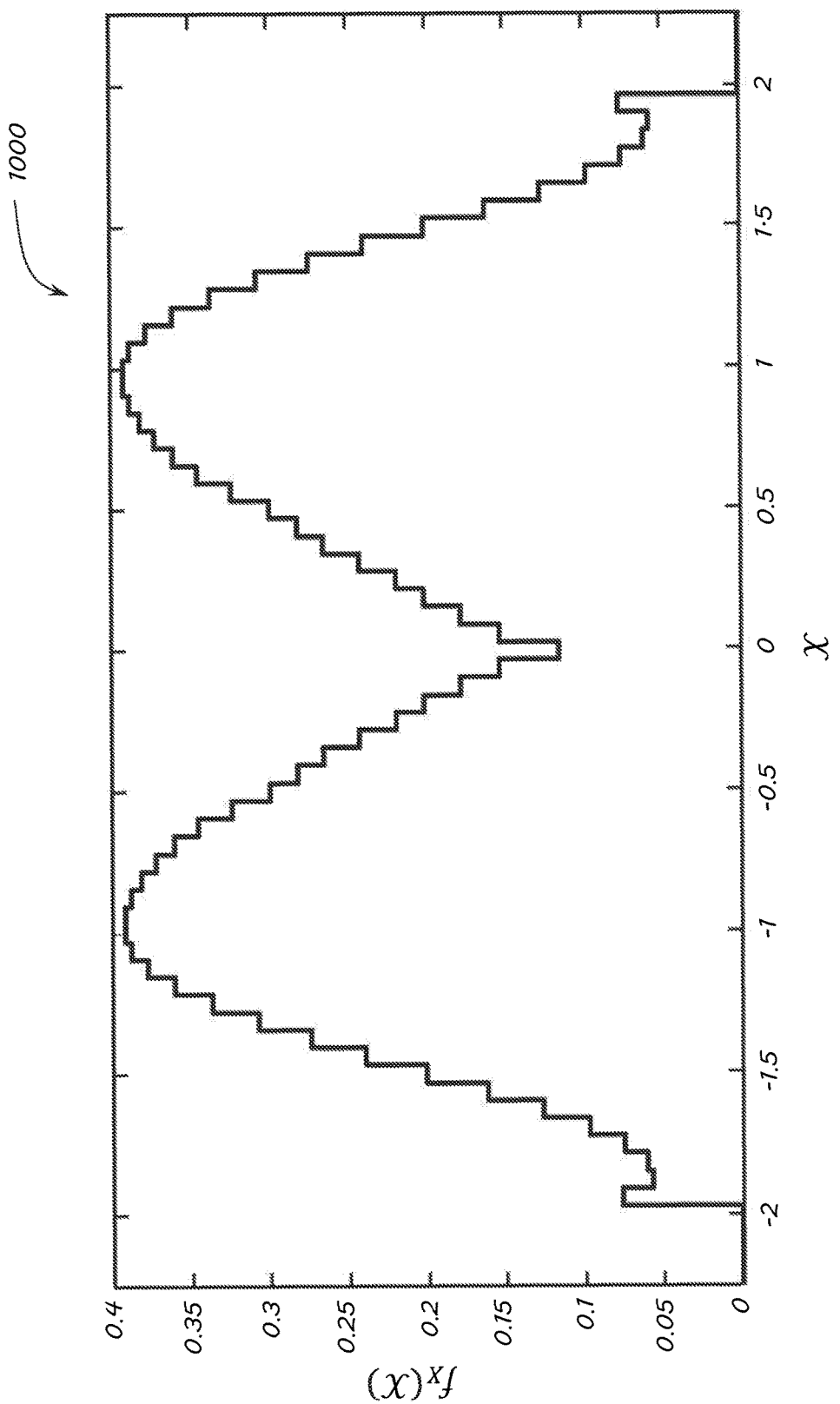
FIG. 9 is a graph illustrating a plot of an exemplary probability density distribution employed by a method of modeling a linear system according to an embodiment of the present invention.

For example, and without limitation, FIG. 9 shows a plot 1000 of a probability density distribution. A density function for two independent random variables may allow the product of these variables to approximate a normal random variable and, thus, may maintain the statistical properties required for Rayleigh fading. Because the random variables used in the product distribution modeling method described herein are independent and identically distributed, some of the correlation properties between impulses may be maintained as well.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus, the scope of the invention should be determined by the appended claims and their legal equivalents, and not by the examples given.

That which is claimed is:

1. A method for emulating a wireless network comprising a plurality K of transmitters and a plurality L of receivers, wherein a subset of the plurality K of transmitters and the plurality of L receivers is characterized by a plurality M of multipath components, the method comprising:

determining a plurality MLK of paths comprising a respective communication channel defined between each of the K transmitters and a respective each of the L receivers;

determining a plurality $q_k$ of input impulses respectively associated with the K transmitters and a plurality $g_l$ of output impulses respectively associated with the L receivers;

determining for each of the MLK paths a respective delay component $\Delta$;

determining for each of the MLK paths a respective loss component $\Gamma$;

determining for each of the MLK paths a respective fading component $\delta$ by calculating a respective weight value for each of the $q_k$ input impulses and for each of the $g_l$ output impulses, wherein each of the weight values is of a time-varying random variable type;

determining a signal propagation value for a modeled communication channel, defined as the communication channel between one of the K transmitters, defined as a modeled transmitter, and one of the L receivers, defined as a modeled receiver, wherein the signal propagation value includes the delay component associated with the modeled communication channel, the loss component associated with the modeled communication channel, and the respective weight values of the $q_k$ input impulses and $g_l$ output impulses associated with the modeled communication channel.

2. The method according to claim 1 wherein determining the signal propagation value for the modeled communication channel further comprises calculating the $q_k$ input impulses and $g_l$ output impulses associated with the modeled communication channel such that a product $g_l q_k$ comprises a zero mean Gaussian random variable characterized by a variance $\sigma_h$.

3. The method according to claim 2 wherein determining the signal propagation value for the modeled communication channel further comprises calculating a received signal associated with the modeled receiver as $$g_l(t_n, \tau) * \left[\sum_{k=1}^{K} G_{k,l} q_k(t_n, \tau) * x_k(t, \tau - d_{k,l})\right].$$

4. The method according to claim 2 wherein determining the signal propagation value for the modeled communication channel further comprises calculating the product $g_l q_k$ as $$\sum_{m_{in}=1}^{M_{in}} \sum_{m_{out}=1}^{M_{out}} A_{in,k,m_{in}} A_{out,l,m_{out}} \delta(\tau - \tau_{in,k,m_{in}} - \tau_{out,l,m_{out}}).$$

5. The method according to claim 4 wherein the modeled communication channel is of a Rayleigh fading type and characterized by a zero mean complex distribution; and wherein determining the signal propagation value for the modeled communication channel further comprises calculating a fading operation output associated with the product $g_l q_k$ as $$A_{in,k,m_{in}} A_{out,l,m_{out}}.$$

6. The method according to claim 1 further comprising emulating the modeled communication channel by
receiving input signals from the modeled transmitter, and
generating, using the signal propagation value, output signals to the modeled receiver.

7. The method according to claim 1 further comprising emulating the modeled communication channel by
receiving input signals from a virtual transmitter, and
generating, using the signal propagation value, output signals to a virtual receiver.

8. A method for emulating a wireless network comprising a plurality K of transmitters and a plurality L of receivers, wherein a subset of the plurality K of transmitters and the plurality of L receivers is characterized by a plurality M of multipath components, and using a product distribution modeling system, defined as a non-transitory computer-readable storage medium comprising a plurality of instructions which, when executed by a computer processor, perform the method comprising:
determining a plurality MLK of paths comprising a respective communication channel defined between each of the K transmitters and a respective each of the L receivers;
determining a plurality $q_k$ of input impulses respectively associated with the K transmitters and a plurality $g_l$ of output impulses respectively associated with the L receivers;
determining for each of the MLK paths a respective delay component $\Delta$;
determining for each of the MLK paths a respective loss component $\Gamma$;
determining for each of the MLK paths a respective fading component $\delta$ by calculating a respective weight value for each of the $q_k$ input impulses and for each of the $g_l$ output impulses, wherein each of the weight values is of a time-varying random variable type;
determining a signal propagation value for a modeled communication channel, defined as the communication channel between one of the K transmitters, defined as a modeled transmitter, and one of the L receivers, defined as a modeled receiver, wherein the signal propagation value includes
the delay component associated with the modeled communication channel,
the loss component associated with the modeled communication channel, and
the respective weight values of the $q_k$ input impulses and $g_l$ output impulses associated with the modeled communication channel.

9. The method according to claim 8 wherein determining the signal propagation value for the modeled communication channel further comprises calculating the $q_k$ input impulses and $g_l$ output impulses associated with the modeled communication channel such that a product $g_l q_k$ comprises a zero mean Gaussian random variable characterized by a variance $\sigma_h$.

10. The method according to claim 9 wherein determining the signal propagation value for the modeled communication channel further comprises calculating a received signal associated with the modeled receiver as $$g_l(t_n, \tau) * \left[\sum_{k=1}^{K} G_{k,l} q_k(t_n, \tau) * x_k(t, \tau - d_{k,l})\right].$$

11. The method according to claim 9 wherein determining the signal propagation value for the modeled communication channel further comprises calculating the product $g_l q_k$ as $$\sum_{m_{in}=1}^{M_{in}} \sum_{m_{out}=1}^{M_{out}} A_{in,k,m_{in}} A_{out,l,m_{out}} \delta(\tau - \tau_{in,k,m_{in}} - \tau_{out,l,m_{out}}).$$

12. The method according to claim 11 wherein the modeled communication channel is of a Rayleigh fading type and characterized by a zero mean complex distribution; and wherein determining the signal propagation value for the modeled communication channel further comprises calculating a fading operation output associated with the product $g_l q_k$ as $$A_{in,k,m_{in}} A_{out,l,m_{out}}.$$

13. The method according to claim 8 further comprising emulating the modeled communication channel by
receiving input signals from the modeled transmitter, and
generating, using the signal propagation value, output signals to the modeled receiver.

14. The method according to claim 8 further comprising emulating the modeled communication channel by
receiving input signals from a signal generator, and generating, using the signal propagation value, output signals to a virtual receiver.

15. A wireless network emulator comprising a plurality K of transmitters and a plurality L of receivers, wherein a subset of the plurality K of transmitters and the plurality of L receivers is characterized by a plurality M of multipath components, and wherein the wireless network emulator is configured for execution by at least one computer processor and modeled using a product distribution modeling system comprising a modeling subsystem;
wherein the modeling subsystem is configured to
determine a plurality MLK of paths comprising a respective communication channel defined between each of the K transmitters and a respective each of the L receivers,
determine a plurality $q_k$ of input impulses respectively associated with the K transmitters and a plurality $g_l$ of output impulses respectively associated with the L receivers,
determine for each of the MLK paths a respective delay component $\Delta$,
determine for each of the MLK paths a respective loss component $\Gamma$,
determine for each of the MLK paths a respective fading component $\delta$ by calculating a respective weight value for each of the $q_k$ input impulses and for each of the $g_l$ output impulses, wherein each of the weight values is of a time-varying random variable type, and
determine a signal propagation value for a modeled communication channel, defined as the communication channel between one of the K transmitters, defined as a modeled transmitter, and one of the L receivers, defined as a modeled receiver, wherein the signal propagation value includes
the delay component associated with the modeled communication channel,
the loss component associated with the modeled communication channel, and
the respective weight values of the $q_k$ input impulses and $g_l$ output impulses associated with the modeled communication channel.

16. The wireless network emulator according to claim 15 wherein the modeling subsystem is further configured to calculate a received signal associated with the modeled receiver as $$g_l(t_n, \tau) * \left[\sum_{k=1}^{K} G_{k,l} q_k(t_n, \tau) * x_k(t, \tau - d_{k,l})\right].$$

17. The wireless network emulator according to claim 15 wherein the modeling subsystem is further configured to calculate the product $g_l q_k$ as $$\sum_{m_{in}=1}^{M_{in}} \sum_{m_{out}=1}^{M_{out}} A_{in,k,m_{in}} A_{out,l,m_{out}} \delta(\tau - \tau_{in,k,m_{in}} - \tau_{out,l,m_{out}}).$$

18. The wireless network emulator according to claim 15 wherein the product distribution modeling system further comprises a testing subsystem configured to emulate the modeled communication channel by
receiving input signals from the modeled transmitter, and
generating, using the signal propagation value, output signals to the modeled receiver.

19. The wireless network emulator according to claim 15 wherein the product distribution modeling system further comprises a testing subsystem configured to emulate the modeled communication channel by
receiving input signals from a virtual transmitter, and
generating, using the signal propagation value, output signals to a virtual receiver.

20. The wireless network emulator according to claim 15 wherein the at least one computer processor further comprises a first processing unit and a second processing unit; and wherein the modeling subsystem is further configured to
determine, using the first processing unit, at least one of the plurality of delay components $\Delta$ and the loss components $\Gamma$, and
determine, using the second processing unit, the plurality of fading components $\delta$.

* * * * *